(12) United States Patent
Voit et al.

(10) Patent No.: US 11,438,151 B2
(45) Date of Patent: Sep. 6, 2022

(54) ENRICHING LOCAL CRYPTOPROCESSOR QUERIES WITH SDN AUGMENTED INFORMATION

(71) Applicant: Cisco Technology, Inc., San Jose, CA (US)

(72) Inventors: Eric Voit, Bethesda, MD (US); Peter Panburana, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 408 days.

(21) Appl. No.: 16/750,786

(22) Filed: Jan. 23, 2020

(65) Prior Publication Data

US 2020/0322143 A1 Oct. 8, 2020

Related U.S. Application Data

(60) Provisional application No. 62/828,721, filed on Apr. 3, 2019.

(51) Int. Cl.
*H04L 9/08* (2006.01)
*H04L 9/32* (2006.01)
*G06F 9/455* (2018.01)

(52) U.S. Cl.
CPC ........ *H04L 9/0866* (2013.01); *G06F 9/45558* (2013.01); *H04L 9/3297* (2013.01); *G06F 2009/45587* (2013.01); *G06F 2009/45595* (2013.01)

(58) Field of Classification Search
CPC ... H04L 9/0866; H04L 9/3297; H04L 9/0897; H04L 2209/12; G06F 9/45558; G06F 2009/45587; G06F 2009/45595
See application file for complete search history.

(56) References Cited

U.S. PATENT DOCUMENTS

| | | | |
|---|---|---|---|
| 9,294,282 B1* | 3/2016 | Potlapally | H04L 9/3236 |
| 9,471,355 B2* | 10/2016 | Coles | H04L 9/3247 |
| 10,320,838 B2 | 6/2019 | Srinivasan et al. | |
| 10,412,077 B2* | 9/2019 | Kumar | H04L 63/0823 |
| 2010/0077395 A1* | 3/2010 | Edwards | H04L 41/5012 718/1 |
| 2013/0086383 A1* | 4/2013 | Galvao de Andrade | G06F 21/57 713/171 |

(Continued)

FOREIGN PATENT DOCUMENTS

| | | |
|---|---|---|
| CN | 103929422 | 1/2017 |
| CN | 107070957 | 8/2017 |

(Continued)

*Primary Examiner* — Matthew Smithers
(74) *Attorney, Agent, or Firm* — Polsinelli PC

(57) ABSTRACT

The present technology discloses a method for enriching local crypto-processor queries with software-defined networking augmented information, comprising sending, from a virtual machine installed on a physical host, a request for trust verification data; augmenting, by an identity verification system on the physical host, the request for trust verification data with encrypted information from an external entity; receiving, at a trusted processor module on the physical host, the request for trust verification data; receiving, at the virtual machine, the trust verification data; and assessing, at the virtual machine, a state of the physical host based on the trust verification data.

20 Claims, 7 Drawing Sheets

(56) References Cited

U.S. PATENT DOCUMENTS

| | | | |
|---|---|---|---|
| 2013/0305340 A1* | 11/2013 | Wotring | H04L 63/1416 |
| | | | 726/11 |
| 2015/0040127 A1* | 2/2015 | Dippenaar | G06F 9/5088 |
| | | | 718/1 |
| 2016/0140343 A1* | 5/2016 | Novak | G06F 9/4416 |
| | | | 713/2 |
| 2017/0171197 A1* | 6/2017 | Alexander | H04L 67/04 |
| 2017/0249082 A1* | 8/2017 | Litke | G06F 3/0604 |
| 2018/0288101 A1* | 10/2018 | Sharma | H04L 9/3297 |
| 2019/0138729 A1* | 5/2019 | Blundell | H04L 9/3234 |
| 2019/0356661 A1* | 11/2019 | Hecht | H04L 9/0891 |
| 2020/0322158 A1* | 10/2020 | Men | H04L 9/0897 |

FOREIGN PATENT DOCUMENTS

| | | |
|---|---|---|
| CN | 108881131 | 11/2018 |
| CN | 109412809 | 3/2019 |

\* cited by examiner

```
                    400
                     ↓

┌─────────────────────────────────────────────────────┐
    │ RECEIVE A PHYSICAL TRUST CERTIFICATION FROM A PHYSICAL│
    │        CRYPTO-PROCESSOR ON A PHYSICAL HOST           │
    │                        400                            │
    └─────────────────────────────────────────────────────┘
                              ↓
```

```
    ┌─────────────────────────────────────────────────────┐       ┌──────┐
    │  GENERATE A NETWORK TRUST CERTIFICATION BASED ON THE │       │ FIG. │
    │          PHYSICAL TRUST CERTIFICATION                │·······│  4B  │
    │                        410                           │       └──────┘
    └─────────────────────────────────────────────────────┘
                              ↓

┌─────────────────────────────────────────────────────┐
    │  PROVIDE THE NETWORK TRUST CERTIFICATION TO A PHYSICAL│
    │      TRUST STATUS VERIFIER ON THE PHYSICAL HOST      │
    │                        420                           │
    └─────────────────────────────────────────────────────┘
                              ↓

┌─────────────────────────────────────────────────────┐
    │    RECEIVE A TRUST REQUEST FOR THE PHYSICAL          │
    │      CRYPTOPROCESSOR FROM A VIRTUAL MACHINE          │
    │                        430                           │
    └─────────────────────────────────────────────────────┘
                              ↓

┌─────────────────────────────────────────────────────┐
    │  AUGMENT THE TRUST REQUEST WITH THE NETWORK TRUST    │
    │  CERTIFICATION AT THE PHYSICAL TRUST STATUS VERIFIER │
    │                        440                           │
    └─────────────────────────────────────────────────────┘
                              ↓

┌─────────────────────────────────────────────────────┐
    │  PROVIDE THE NETWORK TRUST CERTIFICATION AND AN      │
    │  UPDATED PHYSICAL TRUST CERTIFICATION TO THE VIRTUAL │
    │                      MACHINE                         │
    │                        450                           │
    └─────────────────────────────────────────────────────┘
                              ↓

┌─────────────────────────────────────────────────────┐
    │  VERIFY THE INTEGRITY OF THE PHYSICAL HOST BASED ON THE│
    │  NETWORK TRUST CERTIFICATION AND THE UPDATED PHYSICAL │
    │                TRUST CERTIFICATION                    │
    │                        460                            │
    └─────────────────────────────────────────────────────┘
```

GENERATE A NETWORK TRUST CERTIFICATION BASED ON THE PHYSICAL TRUST CERTIFICATION
410

RECEIVE THE PHYSICAL TRUST CERTIFICATION
412

↓

IDENTIFY PLATFORM CONFIGURATION REGISTERS WITH RESPECTIVE TIMESTAMPS IN THE PHYSICAL TRUST CERTIFICATION
414

↓

GENERATE A NETWORK TRUST STATUS FROM THE PLATFORM CONFIGURATION REGISTERS WITH TIMESTAMPS AND QUALIFYING NETWORK DATA
416

↓

PACKAGE THE NETWORK TRUST STATUS, THE PLATFORM CONFIGURATION REGISTERS WITH TIMESTAMPS, AND THE QUALIFYING NETWORK DATA INTO THE NETWORK TRUST CERTIFICATION
418

FIGURE 4B

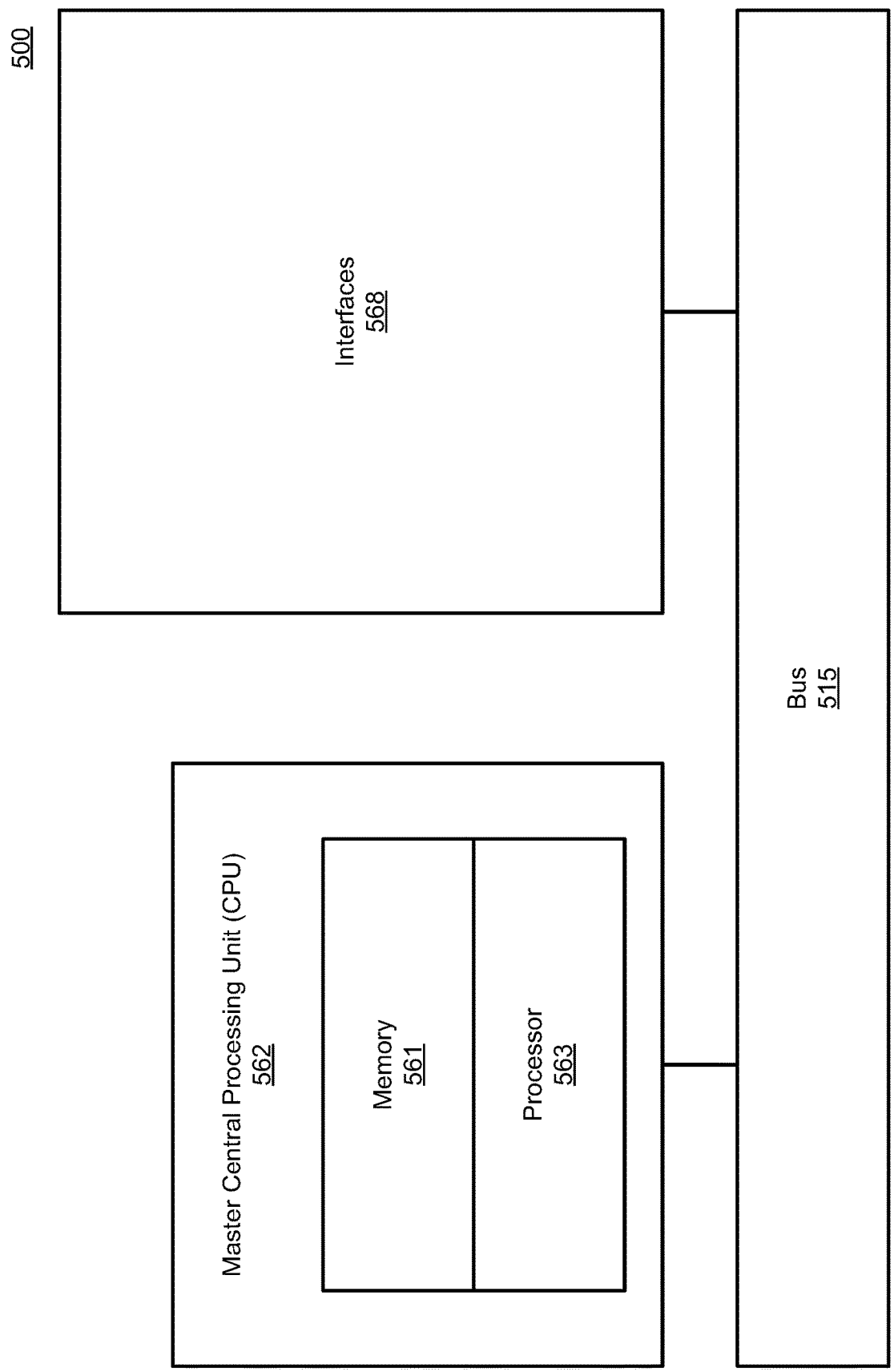

ENRICHING LOCAL CRYPTOPROCESSOR QUERIES WITH SDN AUGMENTED INFORMATION

CROSS-REFERENCE

This application is related to and claims priority under 35 U.S.C. § 119(e) from U.S. Patent Application No. 62/828,721, filed Apr. 3, 2019, the entire contents of which is incorporated herein by reference for all purposes.

TECHNICAL FIELD

The present invention generally relates to network management. In particular, the present invention relates to network security as it pertains to the integrity of individual devices hosting virtual machines, and the trust that those virtual machines can have in such devices.

BACKGROUND

The ubiquity of the Internet in modern society raises opportunities for attacks on networking devices. For virtual machines (VMs) running on a networking device, it is imperative that they be able to know whether their underlying networking device has been compromised by a malicious actor. Often, a VM will send a health query to a hosting device to verify integrity and security health of the device. The VM query will receive a returned value from the queried device and will send a second verification query to a verifying device or service. In effect, multiple queries to multiple systems must be performed and so additional attack vectors, failure points, and communication inefficiencies occur as a result.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompany drawings in which:

FIG. 4A is a flowchart illustrating an example method for verifying a physical host integrity in accordance with some aspects of the present technology;

FIG. 4B is a flowchart illustrating an example method for augmenting a network trust certification in accordance with some aspects of the present technology;

FIG. 5 illustrates an example network device in accordance with some embodiments of the present technology.

DESCRIPTION OF EXAMPLE EMBODIMENTS

Figure 1:
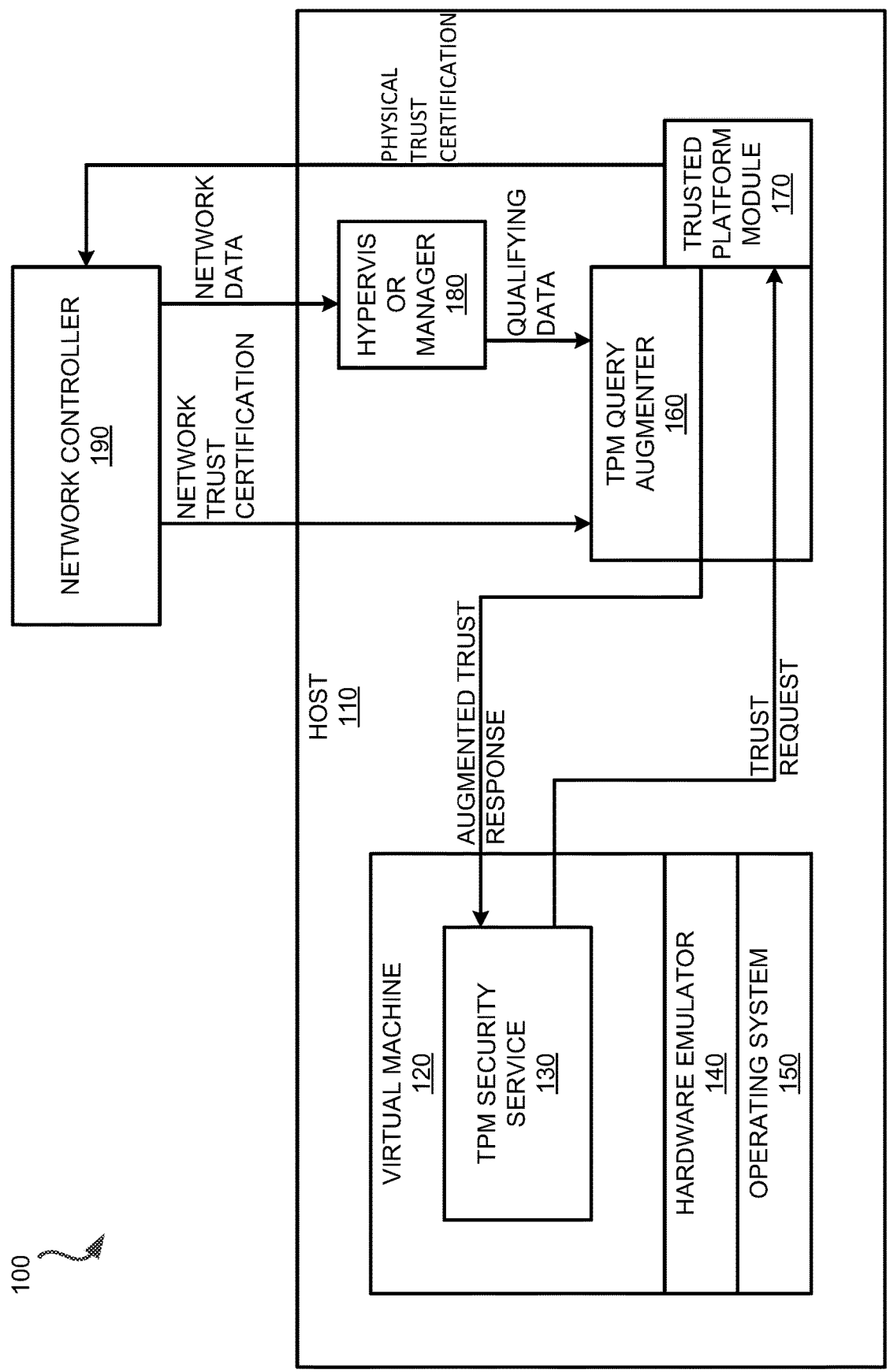
FIG. 1 illustrates an example system for enriching local cryptoprocessor queries in accordance with some aspects of the present technology.

Various embodiments of the disclosure are discussed in detail below. While specific representations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain cases, well-known or conventional details are not described in order to avoid obscuring the description. References to one or more embodiments in the present disclosure can be references to the same embodiment or any embodiment; and, such references mean at least one of the embodiments.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatuses, methods, and their related results according to the embodiments of the present disclosure are given below. Note that titles or subtitles may be used in the examples for convenience of a read, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure can be realized and obtained by means of the instruments and combinations particularly pointed out in the appended claims. These and other features of the disclosure will be become fully apparent from the following description and appended claims, or can be learned by the practice of the principles set forth herein.

OVERVIEW

Security cryptoprocessors, such as trusted platform modules (TPMs), are installed in many devices. In some cases, TPMs are virtualized (vTPMs) and supported in virtual machine (VM) cloud service providers. Cryptoprocessor interfaces are trusted device interfaces and so devices incorporating TPMs and vTPMs may leverage a trusted device interface (TDI).

In particular, TPM query responses may be enriched with, for example and without imputing limitation, trust verification data, identify verification data, etc., to provide security and threat details. VMs may be informed whether a managed network controller, such as a software defined network (SDN) controller, considers an underlying physical host secure and/or a respective security health status returned to a querying device via a respective TDI to be accurate or uncompromised. Additionally, certain security threats, such as man-in-the-middle attacks between a VM and a respective physical host, can be identified by the TDI.

Example Embodiments

A managed network controller can assert flow and content control over messages passing across a respective managed network. Likewise, the managed network controller may maintain health status assertion values for devices that are on the managed network. As a result, the managed network controller can augment query responses to a TPM on the managed network with verification and other information related to a TPM query. In effect, a querying device, such as a VM querying a physical host, for example and without imputing limitation, may receive a managed network controller verified response to a query to a TPM of the physical host and so minimize attack vectors, network traffic, and failure points across the network by providing, with the queried device, augmented security query responses.

In one example, a trusted computing group (TCG) standards based query made to a TPM crypotoprocessor (e.g., by a query originator such as a VM, etc.) is intercepted by a respective managed network controller. The managed network controller augments the intercepted query with security information that is not available to the query originator (e.g., trust verification data, etc.), which can then be included as part of a signed response from the TPM cryptoprocessor to the query originator. As a result, various virtual and containerized applications, such as virtual routers for example and without imputing limitation, are granted access to data enriched by the managed network controller.

In particular, an integrity verification (IV) application may be deployed to a managed network controller. A VM on a network managed by the managed network controller may be informed as to whether a physical host underlying the VM is secure according to the IV application. The IV application may verify physical host security in a variety of ways, including, for example and without imputing limitation, validating that proper files were loaded at a device boot.

Further, evaluation of the physical host by the IV application can be signed by the IV application (e.g., a public key can be attached to the evaluation, etc.). The signed IV application evaluation includes a trust state (e.g., trust verification data, such as levels of confidence in the physical host security, device image information, etc.) and is returned to the physical host. When the VM queries a TPM installed to the physical host for a security posture or state of the physical host (e.g., a security health query, etc.), the most recent signed IV application evaluation can be embedded directly into a response from the TPM to the VM query. As a result, the VM may compare the response with current TPM security posture measurements without having to perform additional queries (e.g., to a third-party data store, verification service, etc.).

In some examples, the network controller may augment a TPM time-check request from the VM to the physical host TPM. As a result, Man-in-the-Middle (MITM) attacks can be identified between a VM and the respective physical host through an identity verification system. Additional information about how the physical host sees the VM can be included in a response as part of the augmentation process and thus passed on to the VM. The augmented response may include, for example and without imputing limitation, a VM host name, identify verification data, such as a unique identifier (UUID) for the VM, VM memory usage of the physical host memory (e.g., statistical information and/or image information, etc.), and the like. In effect, the returned time-check response can further include a fingerprint of the VM making the time-check request and query. As a result, the requesting VM can determine whether it is running directly on a respective hypervisor associated with the physical host without an interim agent, such as in a MITM attack.

The disclosure now turns to a series of figures to provide further explanation and understanding. It is understood that the figures are provided as non-limiting examples. Method steps, system components, sequence diagram messages, and other items may be included, added, removed, modified, and/or reorganized without departing from the spirit and scope of the disclosure.

FIG. 1 illustrates an example system embodiment in accordance with some aspects of the present technology. Queries made to a TPM cryptoprocessor can be intercepted and augmented with network (e.g., SDN) data. The queries may be based on trusted computing group (TCG) standards or alternative standards. The augmented queries may be part of a signed response provided by the cryptoprocessor. As a result, a single signed response returned to its originator (for example, the entity responsible for the query) can include security information not directly available to the originator at the time the request is made. For example, virtual routers and container applications which may be otherwise unaware of network (e.g., SDN) domain level extractions can access network (e.g., SDN) enriched data via the augmented signed response to a query.

Host 110 is a physical hardware host. It houses Operating System 150, which supports Hardware Emulator 140 and Virtual Machine 120. Host 110 also houses Trusted Platform Module 170 (a designated physical crypto-processor), TPM Query Augmenter 160, and Hypervisor Manager 180. Host 110 interacts with Network Controller 190 as part of a network.

TPM Security Service 130 on Virtual Machine 120 can make a trust request to Trusted Platform Module 170. A trust request seeks to verify that Host 110, on which Virtual Machine 120 is installed, maintains its device integrity and has not been compromised in some way.

TPM Query Augmenter can intercept the trust request and augment it with relevant security information. For example, it can include a network trust certification sent from Network Controller 190 to provide an independent security assessment to the trust response. It can include other qualifying data sent from Network Controller 190 via Hypervisor Manager 180, such as data from other devices on the network, data on the behavior of Host 110, or recent network attacks. Hypervisor Manager 180 can also send qualifying host data to TPM Query Augmenter 160 which may be relevant in a security assessment but would not be accessible to Virtual Machine 120 or Trusted Platform Module 170.

The network trust certification can be derived from a variety of factors, including prior physical trust certifications calculated by Trusted Platform Module 170, network behavior of Host 110, or platform configuration registers given by Host 110. The network trust certification gives an independent view of the trustworthiness of Host 110.

Trusted Platform Module 170 takes the network trust certification and any qualifying data, along with a physical trust certification, and sends the data back to Virtual Machine 120. Once received, Virtual Machine 120 can use the physical trust certification and the network trust certification to determine the integrity of Host 110, and act accordingly. For example, downstream services may be alerted if the integrity of Host 110 is determined to be insufficient.

Figure 2:
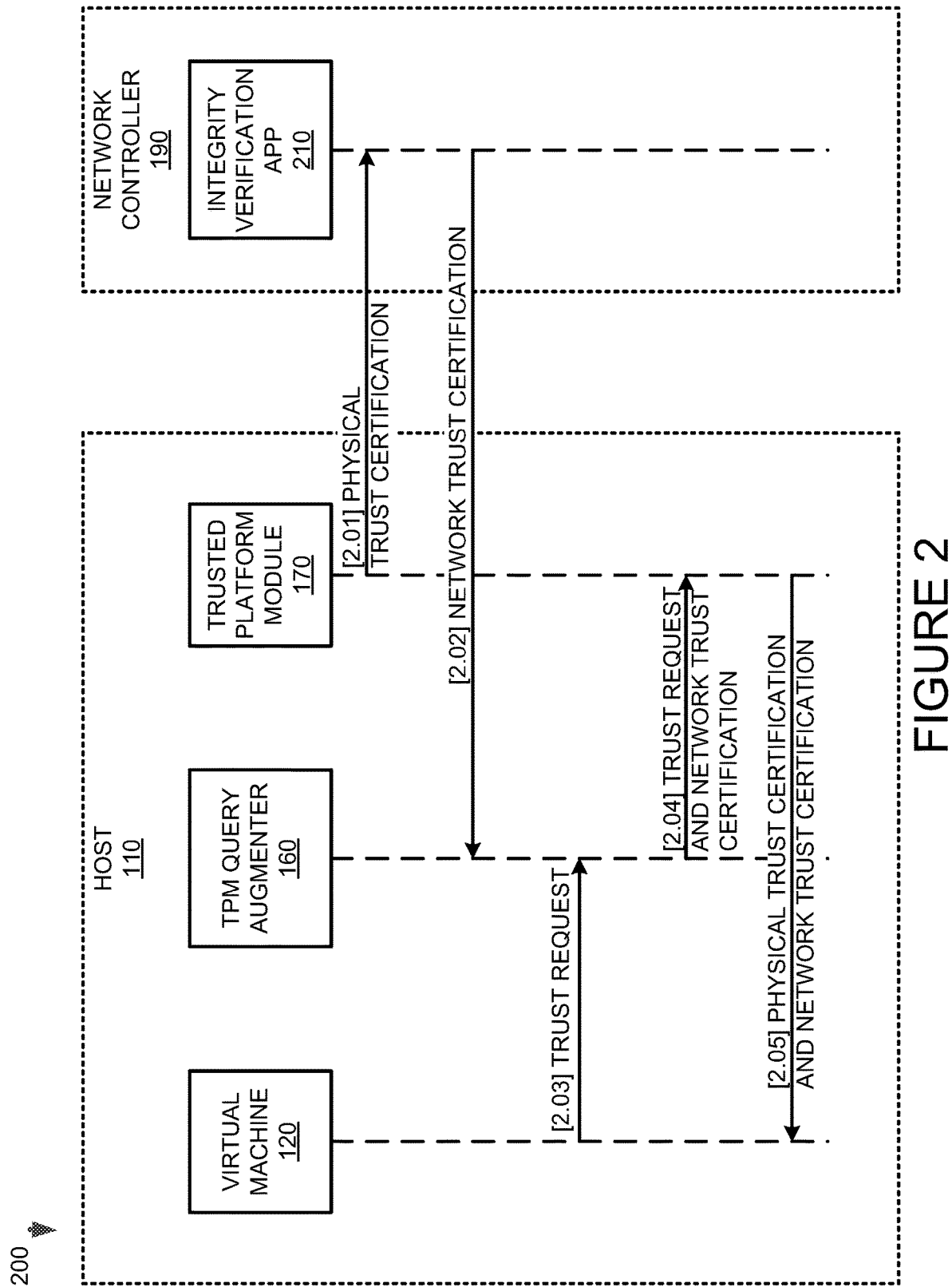
FIG. 2 is an example sequence diagram illustrating a process for enriching local cryptoprocessor queries in accordance with some aspects of the present technology.

FIG. 2 illustrates an example sequence embodiment in accordance with some aspects of the present technology. It depicts one example of an augmentation sequence across a VM, physical host, and network controller. The augmentation sequence includes informing the VM whether an integrity verification (IV) application considers a physical host underlying the VM secure. For example, the IV application may be installed to a network (e.g., SDN) controller and may perform certain validations such as checking whether proper files were at device boot up.

Results of the IV application evaluation of the underlying physical host can be signed by the IV application (e.g., by including a hash or other identifier injected into a packet, etc.). The signed results may include a determined trust and may be provided to the underlying physical host. When a virtual device on the underlying physical host queries a TPM of the physical host regarding its security posture, the signed IV results may be embedded into the response. The signed IV results, including the IV determination of a security posture (e.g., the determined trust), can be compared to a current TPM security posture measurement. In effect, if there is no difference in the measurements, then the VM may save the security posture without requiring any additional queries.

Trusted Platform Module 170 sends to Integrity Verification App 210 *n* Network Controller 190 a message 2.01 including a physical trust certification. The physical trust certification includes the timestamp at which the certification was generated as well as platform configuration registers.

Integrity Verification App 210 sends to TPM Query Augmenter 160 in response a message 2.02 including a network trust certification. The network trust certification contains all of the information present in the physical trust certification and a measurement of Network Controller 190 trust in Host 110. The network trust certification acts as an independent evaluation of the integrity of Host 110.

Virtual Machine 120 then sends to Trusted Platform Module 170 a message 2.03 including a trust request. However, TPM Query Augmenter 160 intercepts the trust request and forwards to TPM Query Augmenter 160 a message 2.04 including the trust request and network trust certification received earlier from Integrity Verification App 210. By adding the network trust certification to the request, a more complete picture of the trustworthiness of Host 110 can be provided.

Trusted Platform Module 170 then generates and sends a new physical trust certification along with the received network trust certification in message 2.05 to Virtual Machine 120. With these two trust certifications, Virtual Machine 120 can more accurately determine the trustworthiness of Host 110. The new physical trust certification includes current platform configuration registers and current timestamps; the network trust certification includes the platform configuration registers and timestamps from message 2.01.

By comparing the platform configuration registers present in the two trust certifications and accounting for the time delay between the two of them, Virtual Machine 120 can get a more accurate picture of the integrity of Host 110. For instance, if the platform configuration registers had changed a great deal in a short amount of time, Virtual Machine 120 may check to see if there had been important changes to Host 110 during that time. If the platform configuration registers had changed very little, even after a long delay, Virtual Machine 120 may conclude that Host 110 is trustworthy.

Figure 3:
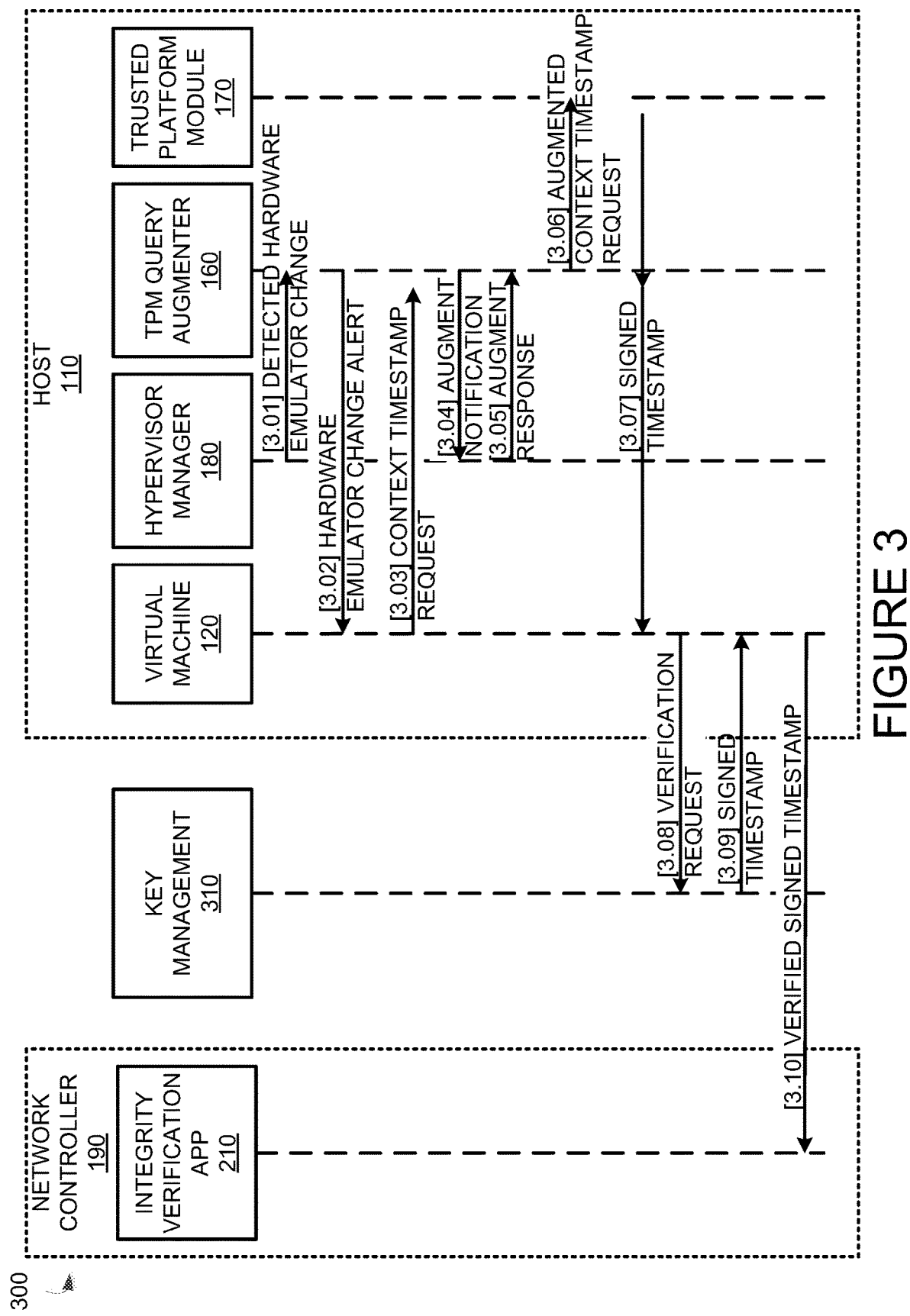
FIG. 3 is an example sequence diagram illustrating a process for verifying hardware in accordance with some aspects of the present technology.

FIG. 3 illustrates another example sequence embodiment in accordance with some aspects of the present technology. It depicts a sequence for augmenting a TPM time-check request from a VM to a TPM on a physical host. The augmented data may be used to identify Man-in-the-Middle (MITM) attacks between the VM and the physical host.

A request (e.g., in the TPM stack) passes a query to the TPM on the physical host. The request can be intercepted and augmented with information indicating how the physical host sees the VM, which the VM may receive back. Augmented information can include items such as a VM hostname, VM identifier, memory information and/or images, usage information, and other elements.

The TPM returns a respective time-check response to the VM including signed data indicating a fingerprint of the VM which made the query to the TPM. As a result, the VM may use the augmented information to determine if it is actually running directly on a hypervisor and without an intervening process acting as a MITM.

Further, the security information discussed above in reference to FIG. 2 can be inserted into the response as part of the augmented information. In effect, the VM may also determine whether the physical host is a trusted device. In cases where an encrypted Auth-session is used by the application to communicate with the TPM, a non-Auth-session may be used for some subset of queries to the TPM and information may be injected into the non-Auth-session queries. Also, or instead, the augmented information may be provided directly to the TPM and then returned as part of the response to the originator.

Hypervisor Manager 180 sends an alert message 3.01 to TPM Query Augmenter 160 indicating a change in Hardware Emulator 140 and/or any other possible change regarding a Man-in-the-Middle layer under Virtual Machine 120. In turn, TPM Query Augmenter 160 sends a message 3.02 to Virtual Machine 120 forwarding the alert and including further change information. This allows Virtual Machine 120 to have a better understanding of the integrity of the underlying stack (Host 110, Operations System 150, and Hardware Emulator 140).

Virtual Machine 120 then sends a message 3.03 to Trusted Platform Module 170 requesting a context timestamp. The context timestamp is used to obtain a verified status of Virtual Machine 120 in relation to Host 110. TPM Query Augmenter 160 intercepts the request and sends to Hypervisor Manager 180 a message 3.04 including notification of the request. In response, Hypervisor Manager 180 augments the response with data, including, but not limited to, the hostname of Virtual Machine 120, an identifier for Virtual Machine 120, memory information and/or images, usage information, or other elements. This information can provide a fingerprint of Virtual Machine 120 and ultimately allow it to determine its relationship to Host 110. The augmented response data is then provided back to TPM Query Augmenter 160 via message 3.05.

Trusted Platform Module 170 receives the context timestamp request augmented with information from TPM Query Augmenter 160 in a message 3.06 from TPM Query Augmenter 160. Trusted Platform Module 170 generates a signed context timestamp and sends a message 3.07 including the signed context timestamp to Virtual Machine 120.

Virtual Machine 120 sends a message 3.08 to a Key Management 310 to verify the received signed timestamp. In return, Key Management 310 sends a signed timestamp as message 3.09 back to Virtual Machine 120 to complete verification. This provides an added layer of security against man-in-the-middle attacks. In particular, Virtual Machine 120 may use the signed timestamp to query Hypervisor Manager 180 for a status, at the timestamp, of Integrity Verification App 210 and match results against information in the received signed timestamp.

Virtual Machine 120 then sends to Integrity Verification App 210 a message 3.10 including the verified and signed timestamp. This information can be used to assess the integrity of Host 110.

FIG. 4A illustrates a method 400 for verifying integrity of a physical host. For example, a VM may wish to verify the integrity of a server or other device upon which it is hosted. FIG. 4B illustrates a method 470 for generating a network trust certification and can be performed in addition to, or as part of, method 400.

At step 402, a physical crypto-processor on a physical host sends a physical trust certification to a network controller. This physical trust certification can include platform configuration registers, timestamps, or other data.

At step 410, the network controller generates a network trust certification for the physical host. This network trust certification can use all or some of the physical trust certification, along with relevant network data, such as host behavior. The network trust certification can include a direct measure of the network controller's trust in the physical host.

Further, at step 410, method 470, as depicted by FIG. 4B, may be performed to generate the network trust certification. At step 412, the network controller first receives the physical trust certification. The physical trust certification contains platform configuration registers measured by the physical crypto-processor, and timestamps reflecting the time when these registers were measured.

At step 414, the network controller identifies the platform configuration registers and respective timestamps of the physical trust certification. At step 416, the identified platform configuration registers and associated timestamps, along with any qualifying network data, are used to generate a network trust status. The qualifying network data may include the behavior of the physical host on the network or other factors. The network trust status serves as a reflection of the network controller's confidence in the integrity of the physical host.

At step 418, the network controller packages the network trust status, the platform configuration registers with their timestamps, and the qualifying network data into the network trust certification.

Returning to FIG. 4A, at step 420, the network controller sends the network trust certification to a physical trust status verifier on the physical host. The physical trust status verifier stores the network trust certification for later use.

At step 430, a virtual machine sends a trust request to the physical crypto-processor to ensure the integrity of the underlying physical host. The virtual machine is installed on the same physical host that the physical crypto-processor is housed on.

At step 440, the physical trust status verifier augments the request with the stored network trust certification. The physical trust status verifier has effectively "intercepted" the trust request and added information from an independent observer (e.g., the network controller).

At step 450, the physical crypto-processor sends a new physical trust certification, along with the received network trust certification, to the virtual machine for consumption. The new physical trust certification includes timestamps and measures that allow for direct comparison with the physical trust data that is contained within the network trust certification.

At step 460, the virtual machine verifies the integrity of the physical host using the data received in the network trust certification and the new physical trust certification. This can include a comparison of platform configuration registries while accounting for the temporal delay between the two measurements, or other assessment means.

FIG. 5 illustrates an exemplary Network Device 500 suitable for implementing the present invention. Network Device 500 includes a Master Central Processing Unit (CPU) 562, Interfaces 568, and a Bus 515 (e.g., a PCI bus). It preferably accomplishes all these functions under the control of software including an operating system and any appropriate applications software. CPU 562 may include one or more Processors 563 such as a processor from the Motorola family of microprocessors or the MIPS family of microprocessors. In an alternative embodiment, Processor 563 is specially designed hardware for controlling the operations of Network Device 500. In a specific embodiment, Memory 561 (such as non-volatile RAM and/or ROM) also forms part of CPU 562. However, there are many different ways in which memory could be coupled to the system.

Interfaces 568 are typically provided as interface cards (sometimes referred to as "line cards"). Generally, they control the sending and receiving of data packets over the network and sometimes support other peripherals used with Network Device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including Memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6:
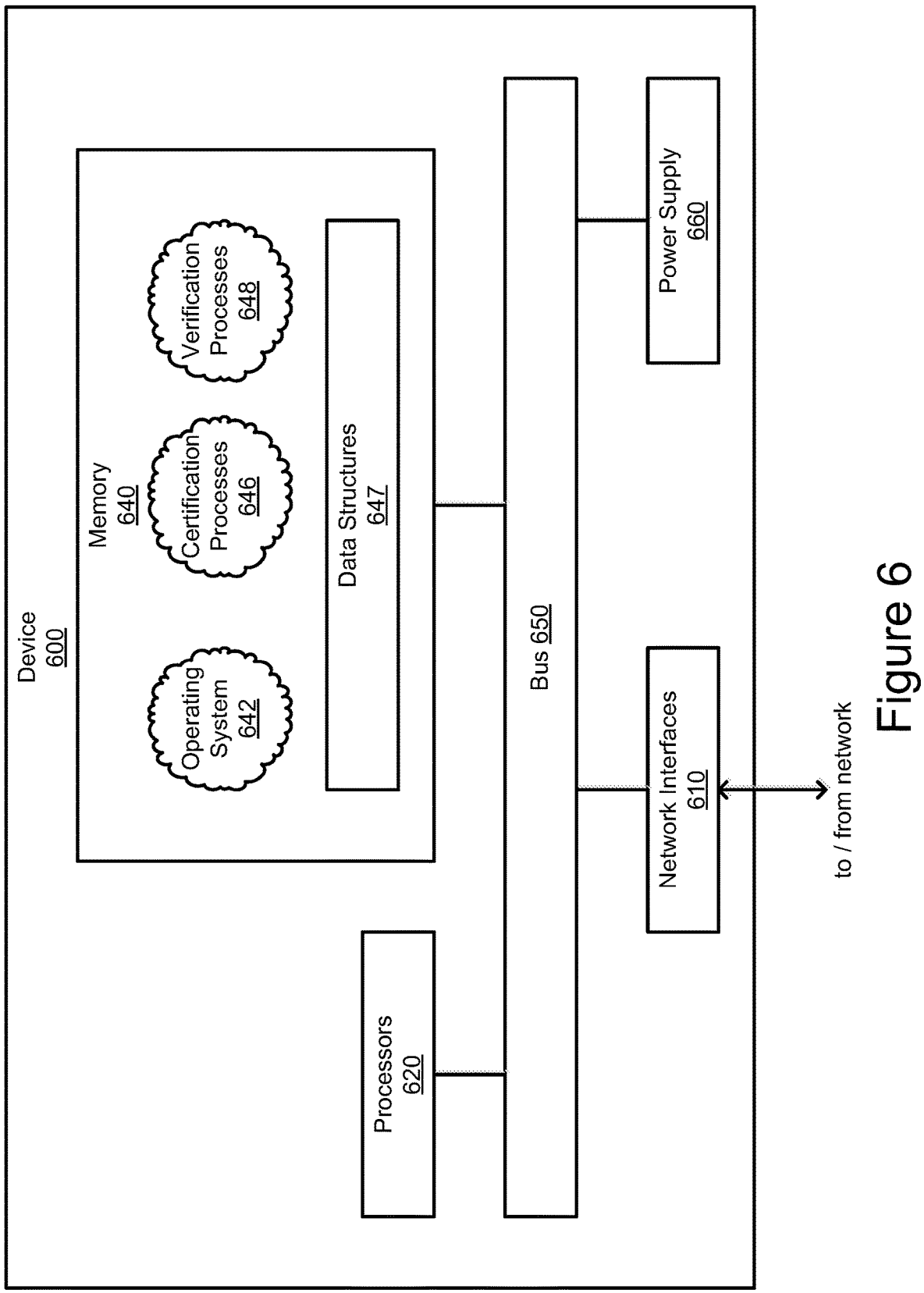
FIG. 6 illustrates an example computing device in accordance with some embodiments of the present technology.

FIG. 6 is a schematic block diagram of an example computing Device 600 that may be used with one or more embodiments described herein e.g., as any of the discussed above or to perform any of the methods discussed above, and particularly as specific devices as described further below. The device may comprise one or more Network Interfaces 610 (e.g., wired, wireless, etc.), at least one Processor 620, and a Memory 640 interconnected by a system Bus 650, as well as a Power Supply 660 (e.g., battery, plug-in, etc.).

Network Interface(s) 610 contain the mechanical, electrical, and signaling circuitry for communicating data over links coupled to a network, e.g., providing a data connection between Device 600 and the data network, such as the Internet. The network interfaces may be configured to transmit and/or receive data using a variety of different communication protocols. For example, Interfaces 610 may include wired transceivers, wireless transceivers, cellular transceivers, or the like, each to allow device 600 to communicate information to and from a remote computing device or server over an appropriate network. The same Network Interfaces 610 also allow communities of multiple devices 600 to interconnect among themselves, either peer-to-peer, or up and down a hierarchy. Note, further, that the nodes may have two different types of network connections, e.g., wireless and wired/physical connections, and that the view herein is merely for illustration. Also, while the Network Interface 610 is shown separately from Power Supply 660, for devices using powerline communication (PLC) or Power over Ethernet (PoE), the Network Interface 610 may communicate through the power supply 660, or may be an integral component of the power supply.

Memory 640 comprises a plurality of storage locations that are addressable by the Processor 620 and the Network Interfaces 610 for storing software programs and data structures associated with the embodiments described herein. The Processor 620 may comprise hardware elements or hardware logic adapted to execute the software programs and manipulate the Data Structures 647. An Operating System 642, portions of which are typically resident in Memory 640 and executed by the processor, functionally organizes the device by, among other things, invoking operations in support of software processes and/or services executing on the device. These software processes and/or services may comprise one or more Certification Processes 646 which, on certain devices, may be used by an illustrative Verification Process 648, substantially corresponding to method 400 discussed above, as described herein. Notably, Certification Processes 646 can include instructions and operations to substantially perform method 470 discussed above and may be stored and/or retrieved for storage by Processor(s) 620 via, for example, Network Interface(s) 610 or other processes according to the configuration of Device 600.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

The disclosure now turns to a series of statements describing examples of the technologies disclosed above. Some examples include:

Statement 1: A method for enriching local crypto-processor queries with software-defined networking augmented information includes sending, from a virtual machine installed on a physical host, a request for trust verification data, augmenting, by an identity verification system on the physical host, the request for trust verification data with encrypted information from an external entity, receiving, at a trusted platform module on the physical host, the request for trust verification data, receiving, at the virtual machine, the trust verification data, and assessing, at the virtual machine, a state of the physical host based on the trust verification data.

Statement 2: The method of the preceding Statement may include the external entity including a network controller.

Statement 3: The method of any of the preceding Statements may include the encrypted information from the network controller including network data.

Statement 4: The method of any of the preceding Statements may include the trust verification data including platform configuration registers and their timestamps.

Statement 5: The method of any of the preceding Statements may further include requesting, by the identity verification system, the encrypted information from the external entity, and receiving, at the identity verification system, the encrypted information from the external entity.

Statement 6: The method of any of the preceding Statements may include the encrypted information from the external entity including prior trust verification data.

Statement 7: The method of any of the preceding Statements may include the trust verification data including host data gathered on the physical host.

Statement 8: A system for enriching local crypto-processor queries with software-defined networking augmented information includes a virtual machine installed on a physical host, wherein the virtual machine is configured to request and receive trust verification data, an external entity, wherein the external entity is configured to send encrypted information, an identity verification system installed on the physical host, wherein the identity verification system is configured is configured to augment a request for trust verification data, and a trusted platform module on the physical host, wherein the trusted platform module is configured to generate the trust verification data.

Statement 9: The system of preceding Statement 8 may include the external entity including a network controller.

Statement 10: The system of preceding Statement 9 may include the encrypted information from the network controller including network data.

Statement 11: The system of any of preceding Statements 8-10 may include the trust verification data including platform configuration registers and their timestamps.

Statement 12: The system of any of preceding Statements 8-11 may include the identity verification system being configured to request and receive the encrypted information from the external entity.

Statement 13: The system of any of preceding Statements 8-12 may include the encrypted information including prior trust verification data.

Statement 14: The system of any of preceding Statements 8-13 may include the trust verification data including host data gathered on the physical host.

Statement 15: A non-transitory computer readable medium storing instructions that, when executed by one or more processors, may cause the one or more processors to send, from a virtual machine installed on a physical host, a request for trust verification data, augment, by an identity verification system on the physical host, the request for trust verification data with encrypted information from an external entity, receive, at a trusted platform module on the physical host, the request for trust verification data, receive, at the virtual machine, the trust verification data, and assess, at the virtual machine, a state of the physical host based on the trust verification data.

Statement 16: The non-transitory computer readable medium of preceding Statement 15 may include the external entity being a network controller.

Statement 17: The non-transitory computer readable medium of preceding Statement 16 may include the encrypted information from the network controller including network data.

Statement 18: The non-transitory computer readable medium of any of preceding Statements 15-17 may include the trust verification data including platform configuration registers and their timestamps.

Statement 19: The non-transitory computer readable medium of any of preceding Statements 15-18 may include the instructions further causing the one or more processors to request, by the identity verification system, the encrypted information from the external entity, and receive, at the identity verification system, the encrypted information from the external entity.

Statement 20: The non-transitory computer readable medium of any of preceding Statements 15-19 may include the encrypted information from the external entity including prior trust verification data, and the trust verification data including host data gathered on the physical host.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A method for enriching local crypto-processor queries with software-defined networking augmented information, the method comprising:
   sending, from a virtual machine installed on a physical host, a request for trust verification data;
   augmenting, by an identity verification system on the physical host, the request for trust verification data with encrypted information from an external entity;
   receiving, at a trusted platform module on the physical host, the request for trust verification data;
   receiving, at the virtual machine, the trust verification data; and
   assessing, at the virtual machine, a state of the physical host based on the trust verification data.

2. The method of claim 1, wherein the external entity comprises a network controller.

3. The method of claim 2, wherein the encrypted information from the network controller comprises network data.

4. The method of claim 1, wherein the trust verification data comprises platform configuration registers and their timestamps.

5. The method of claim 1, further comprising:
   requesting, by the identity verification system, the encrypted information from the external entity; and
   receiving, at the identity verification system, the encrypted information from the external entity.

6. The method of claim 1, wherein the encrypted information from the external entity comprises prior trust verification data.

7. The method of claim 1, wherein the trust verification data comprises host data gathered on the physical host.

8. A system for enriching local crypto-processor queries with software-defined networking augmented information, the system comprising:
   a virtual machine installed on a physical host, wherein the virtual machine is configured to request and receive trust verification data;
   an external entity, wherein the external entity is configured to send encrypted information;
   an identity verification system installed on the physical host, wherein the identity verification system is configured is configured to augment a request for trust verification data; and
   a trusted platform module on the physical host, wherein the trusted platform module is configured to generate the trust verification data.

9. The system of claim 8, wherein the external entity comprises a network controller.

10. The system of claim 9, wherein the encrypted information from the network controller comprises network data.

11. The system of claim 8, wherein the trust verification data comprises platform configuration registers and their timestamps.

12. The system of claim 8, wherein the identity verification system is configured to request and receive the encrypted information from the external entity.

13. The system of claim 8, wherein the encrypted information comprises prior trust verification data.

14. The system of claim 8, wherein the trust verification data comprises host data gathered on the physical host.

15. A non-transitory computer readable medium storing instructions that, when executed by one or more processors, cause the one or more processors to:

send, from a virtual machine installed on a physical host, a request for trust verification data;

augment, by an identity verification system on the physical host, the request for trust verification data with encrypted information from an external entity;

receive, at a trusted platform module on the physical host, the request for trust verification data;

receive, at the virtual machine, the trust verification data; and assess, at the virtual machine, a state of the physical host based on the trust verification data.

16. The non-transitory computer readable medium of claim 15, wherein the external entity is a network controller.

17. The non-transitory computer readable medium of claim 16, wherein the encrypted information from the network controller comprises network data.

18. The non-transitory computer readable medium of claim 15, wherein the trust verification data comprises platform configuration registers and their timestamps.

19. The non-transitory computer readable medium of claim 15, wherein the instructions further cause the one or more processors to:

request, by the identity verification system, the encrypted information from the external entity; and receive, at the identity verification system, the encrypted information from the external entity.

20. The non-transitory computer readable medium of claim 15, wherein the encrypted information from the external entity comprises prior trust verification data, and the trust verification data comprises host data gathered on the physical host.

* * * * *